Patented June 8, 1943

2,321,290

UNITED STATES PATENT OFFICE 2,321,290

TREATING WHITE OILS

Albert P. Giraitis, Maplewood, N. J., assignor to Standard Oil Development Company, a corporation of Delaware No Drawing. Application September 19, 1941, Serial No. 411,494

10 Claims. (Cl. 196—40)

This invention relates to the preparation of stable highly refined mineral oils with particular regard to the treatment of white oil products to effect an improvement in stability, especially as regards color, taste and corrosiveness towards copper. The present application is a continuation in part of my co-pending application, Serial No. 317,561, filed February 6, 1940.

In the preparation of white oil products the base stock is usually a distillate derived from a Mid-Continent type or a Gulf Coast type crude. The distillate is normally subjected to exhaustive sulfuric acid treatment; that is, to treatment with sulfuric acid of concentrations in case of distillates of lubricating oil consistency between 96% strength and 30% fuming acid and with volumes relative to the oil of between 15% and 50% and in the case of distillates of the kerosene boiling range between 96% strength and 20% fuming acid and with volumes relative to the oil of between 5% and 25%. The addition of the acid to the oil is seldom made in a single application, it being more usual to effect the treatment in stages with small quantities of acid and separation of the sludge so formed before the next addition of acid. After the removal from the oil of the acid sludge, the oil is neutralized. The neutralization is usually effected by a 5% to 30% alkali solution of either caustic soda or sodium carbonate applied in a single batch or as a stream in continuous treatment. The neutralized oil is then washed, especially in the case of the heavier white oils, to remove sulfonate soaps, preferably with a water-alcohol mixture, and then blown with steam and then air to remove traces of alcohol and water, if such are considered objectionable in the final product. The oil is then finished by clay treatment to effect an improvement in color, taste and odor. The products of such processing are often chemically unstable, resulting in the development during storage of corrosive compounds, garlic-like odors and unpleasant tastes, any of which changes are commercially objectionable.

In customary practice, the oil distillate is exhaustively treated with sulfuric acid, the sludge separated and the oil phase neutralized with an alkali solution preferably of 10% sodium carbonate, the alkaline solution separated and the oil, if sulfonate soaps are present, washed, preferably with a water-alcohol mixture such as of ethyl or isopropyl alcohol, to remove the soaps; the alcohol and moisture being removed by blowing steam and then air through the oil. The procedure followed in clay treating the acid treated neutralized and steamed oil is to employ an amount of clay sufficient to give a tasteless and odorless oil having a Saybolt color higher than +30. This may be done either by contacting the oil with fine particles of clay or preferably by percolating the oil through a bed of granular clay. In the latter procedure the oil is percolated through the clay bed until there is perceptible a slight taste and/or odor. The oil, after passing through the clay bed, develops the objectionable odor and taste sometime before the clay has lost its capacity to produce an oil having a color greater than +30 Saybolt; that is, the clay has a shorter "taste life" than "color life."

The present invention has for one of its main objects the extension of the "clay life"; that is, employing a decreased amount of clay to produce an oil having commercially acceptable properties of being tasteless, odorless, of good color and non-corrosive towards copper. This is obtained by continuing to pass the white oil feed stock through the clay percolation filters beyond the point of producing odorless and tasteless oils in an amount up to 50% or even 100% or higher in excess of the normal capacity of the filter to produce a tasteless and odorless product and then treating the resultant oil with a small quantity, generally from 2% to 10% and preferably from 3% to 8% by weight, of an alkaline earth basic reacting compound, such as lime or magnesia. Thus the oil is clay treated with a minimum amount of clay to give an oil of color of at least +25 Saybolt. The amount of clay employed is sufficient to insure the production of an oil of at least +25 Saybolt but insufficient to produce an oil of color of +30 Saybolt.

The prior art procedure, on the other hand, is to discontinue the percolation of the oil through the filters when the treated stock at the base of the filter fails to pass taste and odor specifications, usually those of U. S. Pharmacopoeia, upon the completely finished oil and to consider the clay in the filter as being spent.

The process of the present invention is then to treat the highly refined oils of about lubricating oil consistency with a dry alkaline earth basic reacting compound, either alone or in the presence of a decolorizing material such as clay, after the minimum amount of clay has been employed as a treating reagent to effect the production of an oil having a color of at least +25 Saybolt. It has been found that when the alkaline earth basic reacting compound is very finely divided, such as after treatment in a ball mill for about eighteen hours, much smaller quantities can be used to effect similar treating results. By the use of the term, "alkaline earth," the broad significance of the term is intended to be conveyed, namely to cover the oxides, the hydroxides and carbonates of the di-basic alkaline earth metals, which specifically are magnesium, calcium, strontium and barium. Normal atmospheric temperatures are usually employed when the oils are treated with the alkaline earth basic reacting compound by percolation or filtration methods. Elevated temperatures are preferably employed when the oils are treated with the alkaline earth basic reacting compounds by contact methods.

When finishing clay treated oils with the alkaline earth materials, it has now been found unnecessary to use the amounts of clay normally required to give a tasteless, odorless and +30 Saybolt color oil. It has been found that the alkaline earth compounds are effective themselves in improving color, as well as in removing objectionable odors and tastes in incompletely clay refined oils. In general, the amount of clay required for treating is that to bring the acid treated neutralized oil to a +25 Saybolt color. This enhanced treating effect of the alkaline earth basic reacting compounds reduces manufacturing costs for the production of white oils since much less clay is required in the finishing treatment and the oil is satisfactorily finished with the relatively cheap alkaline earth material.

It is appreciated that the alkaline earths have been previously employed in treating petroleum oils. The uses in the past have been mainly in connection with aqueous solutions and aqueous suspensions of the alkaline earth materials and for the treatment of crude stocks for purposes of neutralization and the removal of hydrogen sulfide. As refining agents their uses have been somewhat limited because of their relatively low solubilities in water and because of the development in many cases of treating emulsions due to the formation of sulfonate soaps which are potent emulsifiers. There is disclosed in my copending application, Serial No. 317,561, process involving the use of the alkaline earths in an essentially dry state for the refining of high-grade petroleum products of which the white oils may be cited as examples. The action of the alkaline earths on highly refined oils in the absence of an aqueous phase is specific and is not paralleled by a similar activity of the mono-basic caustic alkalis. The alkaline earths when employed in accordance with the methods of that invention react with, and remove, the undesirable constituents from highly refined and completely clay finished stocks which cause chemical and physical instability as evidenced by color and odor deterioration and the development of corrosive compounds. The present invention is an improvement over the process disclosed in my copending application, Serial No. 317,561, in the discovery and utility of alkaline earth material treating of highly refined petroleum products. This involves a reduction in clay treating costs.

In the preparation of such highly refined petroleum products as the white oils two of the most important controlling tests are those of determining under specific conditions corrosion to the copper strip and to metallic mercury.

*The copper strip corrosion test*

In this test a copper strip is mechanically polished with an inert abrasive material such as tripoli powder on a dampened reclaimed towel or other cloth material free from sizing. The strip is freed of the abrasive material first by dusting with a clean dry cloth and then wiping with filter paper. The size of the copper strip which is employed is convenient for placing in a four ounce sample bottle, that is, strips measuring ½" x 3". The polished strip is then placed in a clean dry four ounce bottle containing sufficient oil to immerse completely the strip. The bottle is stoppered with a clean cork and placed in a constant temperature bath at a temperature of 210° F. for two hours. At the end of the two-hour period the sample is removed from the bath and the appearance of the copper strip compared with the appearance of a similarly polished copper strip which has been heated in an adjacent four ounce bottle containing air. The presence of corrosive substances in the oil sample is indicated by the difference in discoloration between the copper strip immersed in the oil sample and on the blank copper strip.

*The metallic mercury corrosion test*

This test consists in shaking 20 cc. of the oil in a stoppered test tube with 1 cc. of metallic mercury for 30 seconds. The formation of a black deposit in the surface of the mercury indicates the presence of objectionable corrosive materials in the oil sample.

The following example will serve to illustrate the invention. The invention, however, is not limited by the following example which is merely presented for purposes of illustration and to demonstrate the clay economy made possible by the invention.

Two liters of oil treated with 30% of its volume of 20% fuming acid and of viscosity of 345 Saybolt Universal seconds at 100° F. are neutralized with 10% aqueous sodium carbonate solution, washed with a 50–50 water-isopropyl alcohol mixture and blown with steam to remove alcohol. The thus treated oil was divided in two equal portions and treated separately.

I. In the first case the oil was percolated through 50 grams of clay. It had been found from a series of prior tests that 50 grams of clay per liter of oil was the minimum amount of clay required to produce a tasteless, odorless and colorless product from the oil under test. A sample of this clay-percolated 30+ Saybolt color oil failed to pass the copper strip and mercury corrosion tests as previously described and developed a garlic-like odor when exposed for 15 minutes to natural sunlight. The clay-percolated oil was contacted at 70° C. with 40 grams of hydrated lime for one hour, employing mechanical agitation to maintain the lime in dispersion throughout the oil. After the removal of the lime by filtering through paper, the oil passed the special copper strip and mercury corrosion tests and did not develop any garlic-like odor when exposed to natural sunlight for 60 minutes.

II. In the second case the oil was percolated through 25 grams of clay. The thus percolated oil had a color of +26 Saybolt, an unpleasant taste, developed a garlic-like odor in 5 minutes upon exposure to natural sunlight and failed to pass the special copper strip and mercury corrosion tests previously described. The oil was then contacted at 70° C. with 40 grams of hydrated lime for one hour, employing mechanical means of agitation. After removal of the lime by filtering through paper, the oil passed the special copper strip and mercury corrosion tests, did not develop a garlic-like odor after exposure to natural sunlight for 60 minutes, was tasteless and odorless and had a +30 Saybolt color.

In addition to lime, magnesia and the carbonates of calcium and magnesium have been found to be very effective treating reagents. Hydrated lime has been found to be more satisfactory than anhydrous lime. The oxides, hydroxides and carbonates of strontium and barium are effective treating reagents but less extensively employed because of their higher cost.

While the invention has been described in some detail and a number of illustrated examples have been given, it is to be understood that the invention is not limited thereby, but the same have been given for purposes of conveying appreciation of the scope and nature of the invention. It will be obvious to those skilled in the art that variations of the process can be made within the spirit of the invention.

What is claimed is:

1. The process of refining viscous mineral white oils, which comprises exhaustively treating a petroleum oil of lubricating oil consistency with concentrated sulfuric acid, separating the sludge, then neutralizing the oil with an aqueous alkali solution, separating the aqueous solution, washing the oil with a water-isopropyl alcohol mixture, treating the oil with steam and then with air to remove traces of alcohol and water, treating the oil with an amount of clay sufficient to insure the production of an oil of color of at least 25 Saybolt but insufficient to produce an oil of color of 30 Saybolt, and then with a dry alkaline earth basic reacting compound.

2. The process of refining viscous mineral white oils, which comprises exhaustively treating a petroleum oil of lubricating oil consistency with concentrated sulfuric acid, separating the sludge, then neutralizing the oil with an aqueous alkali solution, separating the aqueous solution, washing the oil with a water-isopropyl alcohol mixture, treating the oil with steam and then with air to remove traces of isopropyl alcohol and water, contacting the oil with an amount of clay sufficient to insure the production of an oil of color of at least 25 Saybolt but insufficient to produce an oil of color of 30 Saybolt, and then contacting the oil with an alkaline earth basic reacting compound.

3. The process, according to claim 2, in which the alkaline earth basic reaction compound is lime.

4. The process, according to claim 2, in which the alkaline earth basic reacting compound is magnesia.

5. The process, according to claim 2, in which the alkaline earth basic reacting compound is a mixture of lime and magnesia.

6. In the process of preparing viscous white mineral oils in which a petroleum oil of lubricating oil consistency has been exhaustively treated with concentrated sulfuric acid and clay is used in the finishing treatment, an improved method for obtaining increased yield of finished white oils which comprises passing the white oils through a clay percolation filter in an amount up to 100 in excess of the normal capacity of the filter to produce odorless and tasteless oils and then treating the percolated oil which is below odor and taste specifications with a small amount of a dry alkaline earth basic reacting compound.

7. In the process according to claim 6, in which the amount of white oils passed through the clay percolation filter in excess of the normal capacity of the filter to produce odorless and tasteless oils is between 50% and 100%.

8. In the process according to claim 6, in which the dry alkaline earth basic reacting compound is lime.

9. In the process according to claim 6, in which the dry alkaline earth basic reacting compound is magnesia.

10. In the process according to claim 6, in which the dry alkaline earth basic reacting compound is a mixture of lime and magnesia.

ALBERT P. GIRAITIS.

CERTIFICATE OF CORRECTION.

Patent No. 2,321,290.  June 8, 1943.

ALBERT P. GIRAITIS.

It is hereby certified that error appears in the above numbered patent requiring correction as follows: In the grant, lines 2 and 12, name of assignee, for "Standard Oil Company" read --Standard Oil Development Company--; and that the said Letters Patent should be read with this correction therein that the same may conform to the record of the case in the Patent Office.

Signed and sealed this 20th day of July, A. D. 1943.

(Seal)

Henry Van Arsdale,
Acting Commissioner of Patents.